United States Patent
Chen et al.

(10) Patent No.: US 8,803,914 B2
(45) Date of Patent: Aug. 12, 2014

(54) MACHINE-IMPLEMENTED METHOD, SYSTEM AND COMPUTER PROGRAM PRODUCT FOR ENABLING A USER TO VIRTUALLY TRY ON A SELECTED GARMENT USING AUGMENTED REALITY

(75) Inventors: Lien-Wu Chen, Zhongli (TW); Yu-Chee Tseng, Hsinchu (TW); Jen-Hsiang Cheng, Taichung (TW); Chia-Yu Ku, Taichung (TW); Yi-Bel Chen, Taipei (TW); Ting Teng, Hsinchu County (TW)

(73) Assignee: National Tsing Hua University, Hsinchu (TW)

( * ) Notice: Subject to any disclaimer, the term of this patent is extended or adjusted under 35 U.S.C. 154(b) by 525 days.

(21) Appl. No.: 13/116,854

(22) Filed: May 26, 2011

(65) Prior Publication Data

US 2012/0162256 A1    Jun. 28, 2012

(30) Foreign Application Priority Data

Dec. 24, 2010    (TW) .............................. 099145863 A (51) Int. Cl.
*G09G 5/00*    (2006.01)
*G06Q 30/06*   (2012.01)

(52) U.S. Cl.
CPC ..................................... *G06Q 30/06* (2013.01)

USPC .......................................... 345/633; 345/629

(58) Field of Classification Search
USPC .................................................. 345/633, 629
See application file for complete search history.

(56) References Cited

U.S. PATENT DOCUMENTS

2004/0227752 A1* 11/2004 McCartha et al. ............ 345/419
2011/0040539 A1*  2/2011 Szymczyk et al. ................ 703/6

* cited by examiner

*Primary Examiner* — Maurice L McDowell, Jr.
(74) *Attorney, Agent, or Firm* — Birch, Stewart, Kolasch & Birch, LLP (57) ABSTRACT

In a machine-implemented method for use with a handheld device, a user is able to virtually try on a selected garment using augmented reality. The machine-implemented method includes: (A) establishing a garment database containing information corresponding to at least one garment, the information corresponding to each garment including a backside image of the garment; (B) establishing a marker database containing feature information of a backside marker; and (C) upon determining from a captured image of the user who is tagged with at least one physical maker that the physical marker corresponds to the backside marker, retrieving from the garment database the backside image of a selected garment, and superimposing the retrieved backside image onto the captured image of the user to form a composite image for display on a screen of the handheld device.

17 Claims, 12 Drawing Sheets

MACHINE-IMPLEMENTED METHOD, SYSTEM AND COMPUTER PROGRAM PRODUCT FOR ENABLING A USER TO VIRTUALLY TRY ON A SELECTED GARMENT USING AUGMENTED REALITY

CROSS-REFERENCE TO RELATED APPLICATION

This application claims priority of Taiwanese Application No. 099145863, filed on Dec. 24, 2010.

BACKGROUND OF THE INVENTION

1. Field of the Invention

The invention relates to a method and system for trying on a garment, more particularly to a machine-implemented method, a system and a computer program product for enabling a user to virtually try on a selected garment using augmented reality.

2. Description of the Related Art

Internet shopping has become a popular and convenient way of making purchases of commodities. When purchasing a garment online, there is a risk that the garment may not fit the consumer properly because the consumer is unable to try on the garment in advance before making the purchase, thereby creating the possibility of having to go through a tedious and troublesome exchange or refund process. In view of this risk, some consumers are held back from shopping for garments online.

Therefore, in order to solve this problem, a conventional system enabling a consumer to virtually try on clothes using augmented reality has been developed, where the front side of the consumer needs to be tagged with a marker for detection. However, with this type of conventional system, one can only see a front image of him/herself in the garment, and not the side or the back. In other words, the consumer is unable to acquire a full picture of how the garment would fit on him/her with the conventional system.

SUMMARY OF THE INVENTION

Therefore, the object of the present invention is to provide a machine-implemented method, a system and a computer program product enabling a user to try on a selected garment using augmented reality while eliminating the drawbacks of the prior art.

According to one aspect of the present invention, there is provided a machine-implemented method for use with a handheld device to enable a user to virtually try on a selected garment using augmented reality. The machine-implemented method comprises the steps of: (A) establishing a garment database that contains information corresponding to at least one garment, the information corresponding to each of said at least one garment including a backside image of the garment; (B) establishing a marker database containing feature information of a backside marker; and (C) upon determining from a captured image of the user who is tagged with at least one physical maker that the physical marker corresponds to the backside marker with reference to the marker database, performing the sub-steps of (C-1) retrieving from the garment database the backside image of a selected one of said at least one garment, and (C-2) superimposing the backside image retrieved in sub-step (C-1) onto the captured image of the user to form a composite image for display on a screen of the handheld device.

Preferably, when the user is tagged with two of the physical markers, in the garment database established in step (A), the information corresponding to each of said at least one garment includes the backside image of the garment in each of two different sizes. In this case, upon determining in step (C) that each of the two physical markers corresponds to the backside marker with reference to the marker database, step (C) further includes the sub-step of determining a distance between the two physical markers with reference to the captured image of the user so as to serve as a shoulder width of the user, and in sub-step (C-1), the backside image is retrieved from the garment database with reference to the shoulder width, and is of the size that is the most closely related to the shoulder width.

Further, in one implementation, in the garment database established in step (A), the information corresponding to each of said at least one garment further includes a left/right side image of the garment. The marker database established in step (B) further contains feature information of a left/right side marker. The machine-implemented method further comprises the step of (D) upon determining from the captured image of the user that the physical marker corresponds to the left/right side marker with reference to the marker database, performing the sub-steps of (D-1) retrieving from the garment database the left/right side image of the selected one of said at least one garment, and (D-2) superimposing the left/right side image retrieved in sub-step (D-1) onto the captured image of the user to form another composite image for display on at least one of the screen of the handheld device and a main display screen.

In another implementation, in the garment database established in step (A), the information corresponding to each of said at least one garment further includes a front side image of the garment. The marker database established in step (B) further contains feature information of a front side marker. The machine-implemented method further comprises the step of (E) upon determining from the captured image of the user that the physical marker corresponds to the front side marker with reference to the marker database, performing the sub-steps of (E-1) retrieving from the garment database the front side image of the selected one of said at least one garment, and (E-2) superimposing the front side image retrieved in sub-step (E-1) onto the captured image of the user to form another composite image for display on at least one of the screen of the handheld device and a main display screen.

In still another implementation, where the user is tagged with two of the physical markers, in the garment database established in step (A), the information corresponding to each of said at least one garment includes the front side image of the garment in each of two different sizes. Upon determining in step (E) that each of the two physical markers corresponds to the front side marker with reference to the marker database, step (E) further includes the sub-step of determining a distance between the two physical markers with reference to the captured image of the user so as to serve as a shoulder width of the user, and in sub-step (E-1), the front side image is retrieved from the garment database with reference to the shoulder width, and is of the size that is the most closely related to the shoulder width.

According to another aspect of the present invention, there is provided a system to be used with a handheld device that includes a screen and an image capturing module that captures an image of a user for enabling the user to virtually try on a selected garment using augmented reality. The user is tagged with at least one physical marker. The system includes a marker database, a garment database, an image recognition module and an image processing module. The marker database contains feature information of a backside marker. The garment database contains information corresponding to at least one garment. The information corresponding to each of said at least one garment includes a backside image of the garment. The image recognition module is capable of accessing the marker database, and determines from the image of the user as captured by the image capturing module whether the physical marker corresponds to the backside marker with reference to the marker database. The image processing module is in communication with the image recognition module, and is capable of accessing the garment database. The image processing module retrieves from the garment database the backside image of a selected one of said at least one garment, and superimposes the backside image thus retrieved onto the image of the user as captured by the image capturing module to form a composite image for display on the screen of the handheld device when the image recognition module determines that the physical marker corresponds to the backside marker.

Preferably, the image processing module transmits the composite image to the handheld device for display on the screen of the handheld device.

Alternatively, the image processing module is provided in the handheld device, and the image recognition module notifies the image processing module of the result of the determination.

In one implementation, where the user is tagged with two of the physical markers, the information in the garment database and corresponding to each of said at least one garment includes the backside image of the garment in each of two different sizes. The image recognition module determines from the image of the user as captured by the image capturing module whether each of the two physical markers corresponds to the backside marker with reference to the marker database. The image processing module determines a distance between the two physical markers with reference to the image of the user so as to serve as a shoulder width of the user when the image recognition module determines that each of the two physical markers corresponds to the backside marker. The image processing module retrieves from the garment database the backside image with reference to the shoulder width, and the backside image thus retrieved is of the size that is the most closely related to the shoulder width.

In another implementation, the information in the garment database and corresponding to each of said at least one garment further includes a left/right side image of the garment. The marker database further contains feature information of a left/right side marker. The image recognition module further determines from the image of the user as raptured by the image capturing module whether the physical marker corresponds to the left/right side marker with reference to the marker database. The image processing module retrieves from the garment database the left/right side image of the selected one of said at least one garment, and superimposes the left/right side image thus retrieved onto the image of the user as captured by the image capturing module to form another composite image for display on at least one of the screen of the handheld device and a main display screen when the image recognition module determines that the physical marker corresponds to the left/right side marker.

In another implementation, the information in the garment database and corresponding to each of said at least one garment further includes a front side image of the garment. The marker database further contains feature information of a front side marker. The image recognition module further determines from the image of the user as captured by the image capturing module whether the physical marker corresponds to the front side marker with reference to the marker database. The image processing module retrieves from the garment database the front side image of the selected one of said at least one garment, and superimposes the front side image thus retrieved onto the image of the user to form another composite image for display on at least one of the screen of the handheld device and a main display screen when the image recognition module determines that the physical marker corresponds to the front side marker. Preferably, when the user is tagged with two of the physical markers, the information in the garment database and corresponding to each of the at least one garment includes the front side image of the garment in each of two different sizes. The image recognition module determines from the image of the user as captured by the image capturing module whether each of the two physical markets corresponds to the front side marker with reference to the marker database. The image processing module determines a distance between the two physical markers with reference to the image of the user so as to serve as a shoulder width of the user when the image recognition module determines that each of the two physical markers corresponds to the front side marker. The image processing module retrieves from the garment database the front side image with reference to the shoulder width, and the front side image thus retrieved is of the size that is the most closely related to the shoulder width.

According to still another object of the present invention, there is provided a computer program product that comprises a computer readable storage medium that includes program instructions, which when executed by an electronic device, cause the electronic device to perform the above-mentioned method.

The advantages and effects achieved by the present invention lie in that it enables the user to visualize how the selected garment would look on him/her from the back, the front, and the sides with the aid of the handheld device, and that it enables automatic selection of the most appropriate size of the selected garment for the virtual try on.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 1:
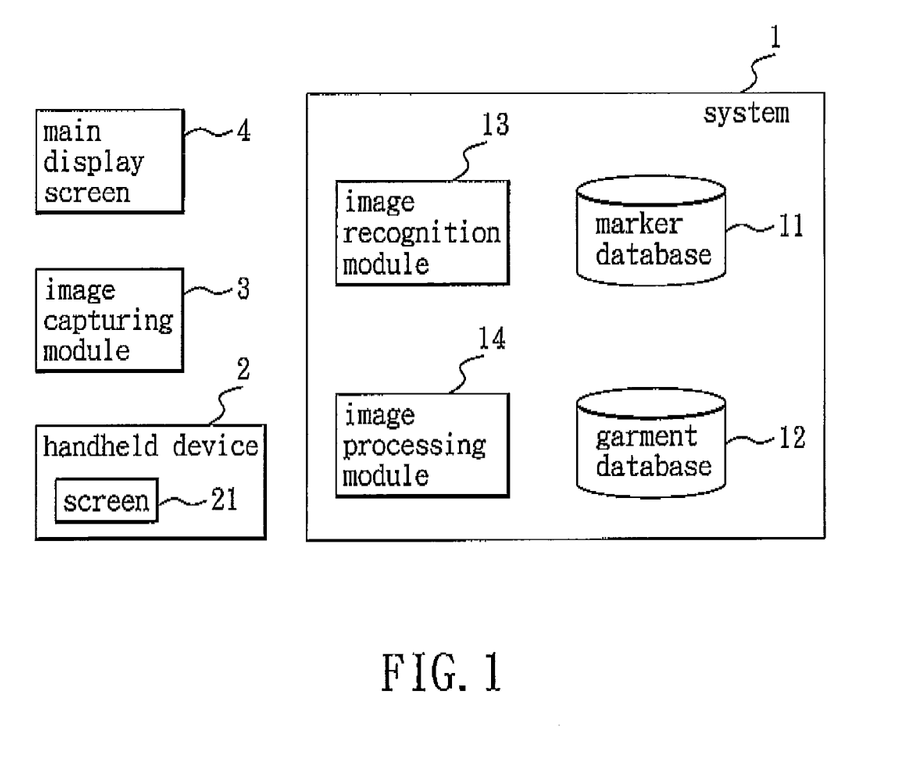
FIG. 1 is a block diagram, illustrating the first preferred embodiment of a system for enabling a user to virtually try on a selected garment using augmented reality according to the present invention.
Figure 2:
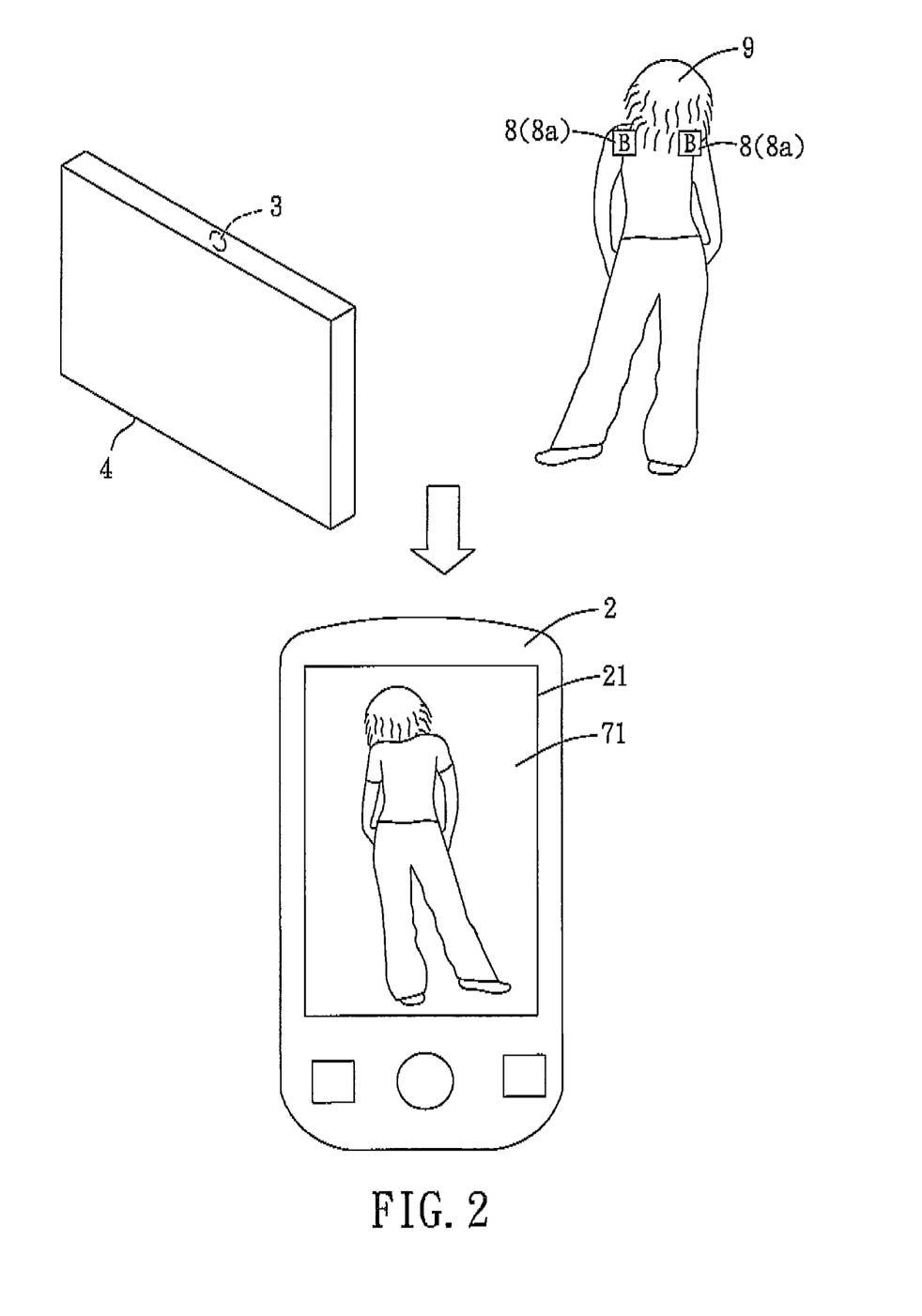
FIG. 2 is a schematic diagram, illustrating a backside fitting of the selected garment on the user.

With reference to FIG. 1 and FIG. 2, the first preferred embodiment of a system 1 for enabling a user 9 to virtually try on a selected garment using augmented reality is to be used with a handheld device 2 that includes a screen 21, and an image capturing module 3 that captures an image of the user 9. In order to use the system 1, the user 9 needs to be tagged with at least one physical marker 8. The image capturing module 3 may, for instance, be a CCD or a CMOS camera. The system 1 includes a marker database 11, a garment database 12, an image recognition module 13 and an image processing module 14. The marker database 11 contains feature information of a backside marker 8a. The garment database 12 contains information corresponding to at least one garment. The information corresponding to each of said at least one garment includes a backside image of the garment. The image recognition module 13 is capable of accessing the marker database 11, and determines from the image of the user 9 as captured by the image capturing module 3 whether the physical marker 8 corresponds to the backside marker 8a with reference to the marker database 11. The image processing module 14 is in communication with the image recognition module 13, and is capable of accessing the garment database 12. The image processing module 14 retrieves from the garment database 12 the backside image of a selected one of said at least one garment, and superimposes the backside image thus retrieved onto the image of the user gas captured by the image capturing module 8 to forma first composite image 71 for display on the screen 21 of the handheld device 2 when the image recognition module 13 determines that the physical marker 8 corresponds to the backside marker 8a.

Figure 3:
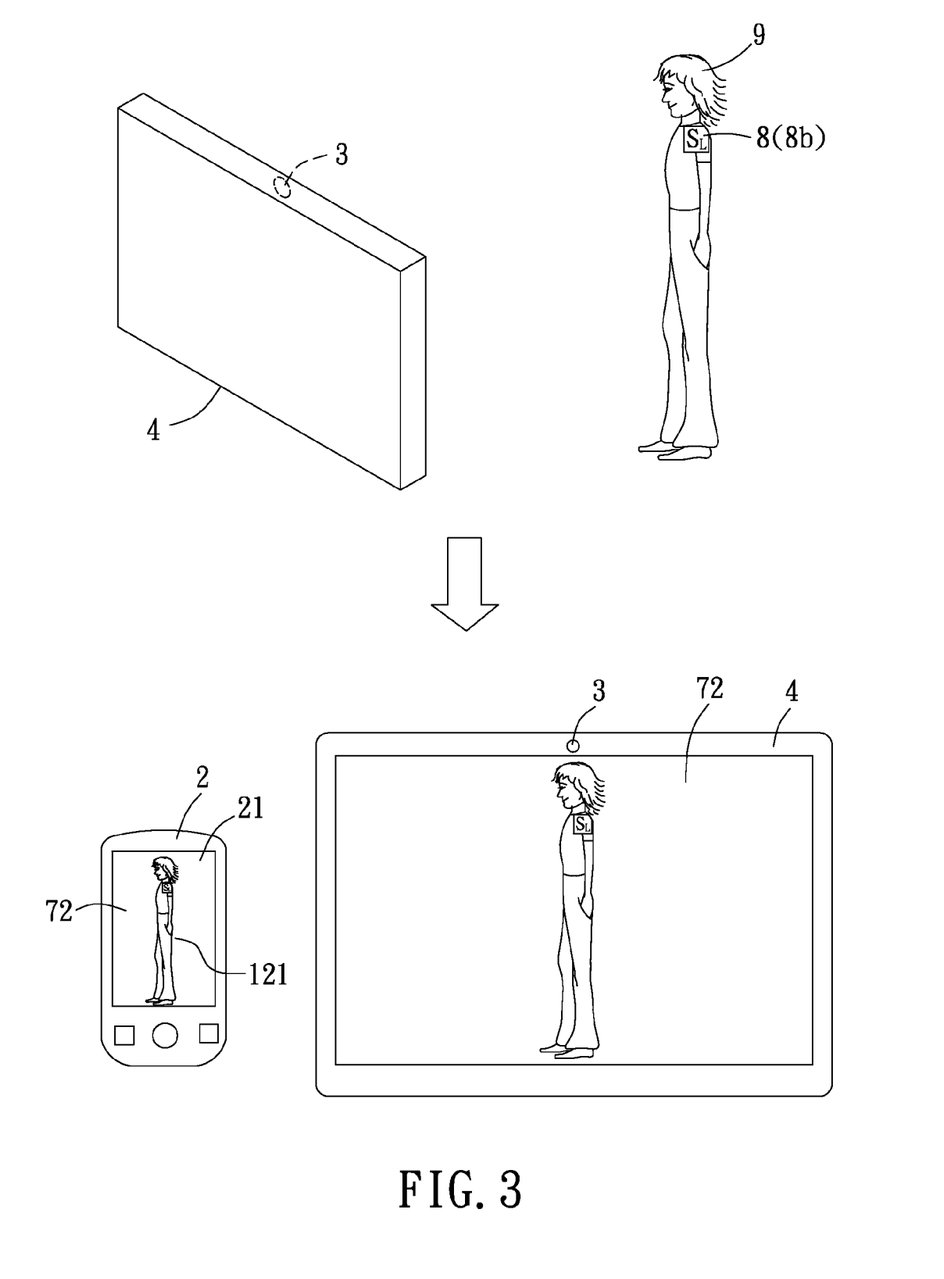
FIG. 3 is a schematic diagram, illustrating a left side fitting of the selected garment on the user.
Figure 4:
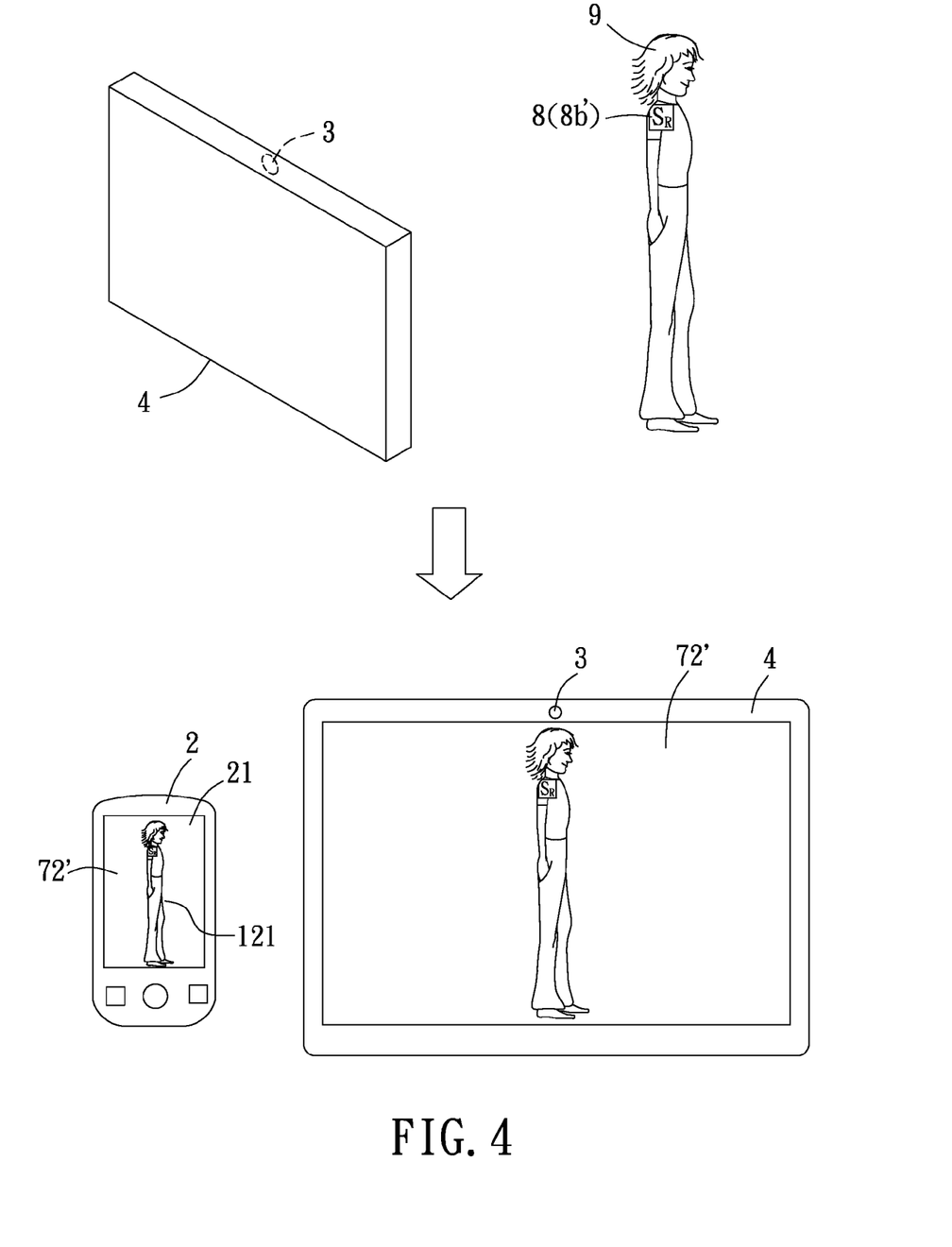
FIG. 4 is a schematic diagram, illustrating a right side fitting of the selected garment on the user.

With further reference to FIG. 3 and FIG. 4, the system 1 of the first preferred embodiment is preferably further used with a main display screen 4. The information in the garment database 12 and corresponding to each of said at least one garment further includes a left side image and a right side image of the garment. The marker database 11 further contains feature information of a left side marker 8a and a right side marker 8b'. The image recognition module 13 further determines from the image of the user 9 as captured by the image capturing module 3 whether the physical marker 8 corresponds to the left or right side marker 8b, with reference to the marker database 11. The image processing module 14 retrieves from the garment database 12 the left or right side image of the selected one of said at least one garment, and superimposes the left or right side image thus retrieved onto the image of the user 9 as captured by the image capturing module 3 to form a second composite image 72, 72' for display on at least one of the screen 21 of the handheld device 2 and the main display screen 4 when the image recognition module 13 determines that the physical marker 8 corresponds to the left or right side marker 8b, 8b'.

Figure 5:
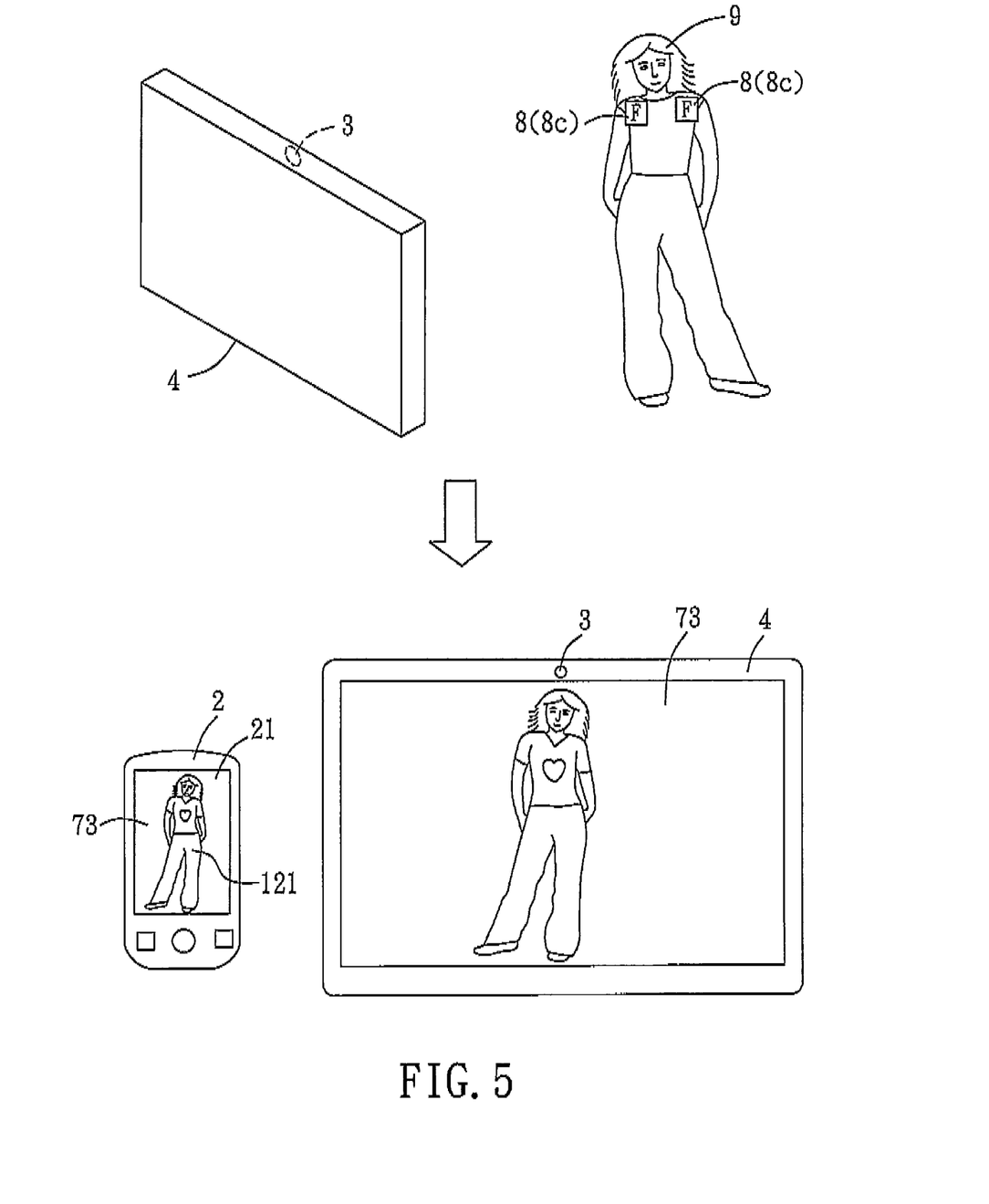
FIG. 5 is a schematic diagram, illustrating a front side fitting of the selected garment on the user.

With further reference to FIG. 5, in the first preferred embodiment, the information in the garment database 12 and corresponding to each of said at least one garment further includes a front side image of the garment. The marker database 11 further contains feature information of a front side marker 8c. The image recognition module 13 further determines from the image of the user 9 as captured by the image capturing module 3 whether the physical marker 8 corresponds to the front side marker 8c with reference to the marker database 11. The image processing module 14 retrieves from the garment database 12 the front side image of the selected one of said at least one garment, and superimposes the front side image thus retrieved onto the image of the user 9 to form a third composite image 73 for display on at least one of the screen 21 of the handheld device 2 and the main display screen 4 when the image recognition module 13 determines that the physical marker 8 corresponds to the front side marker 8c.

In this embodiment, as shown in FIG. 2, the first composite image 71 (i.e., virtual backside fitting of the selected garment) is displayed on the screen 21 of the handheld device 2, and as shown in FIGS. 3, 4 and 5, each of the second and third composite images 72, 72', 73 (i.e., each of virtual left, right and front side fittings of the selected garment) is displayed on both the screen 21 of the handheld device 2 and the main display screen 4. However, it should be noted herein that the first composite image 71 may also be simultaneously displayed on the main display screen 4 for view by others, while the handheld device 2 may be held by the user 9 to facilitate easy viewing of the first and second composite images 71, 72.

According to the above, the image processing module 14 also transmits the composite image 71, 72, 72' and/or 73 to the handheld device 2 for display on the screen 21 of the handheld device 2.

The system 1 may further include an input device (not shown) so as to enable the user 9 to make the selection of the garment the user 9 desires to try on. The main display screen 4 and the input device may be incorporated into and implemented as a touch control liquid crystal display (LCD). The touch control liquid crystal display may display a user interface (not shown) to facilitate user input.

The first preferred embodiment may be used by an online store, in which the consumer (i.e., the user 9), who may be sitting at home in his/her room, is in possession of the handheld device 2 (e.g., a cellular phone, a tablet computer, etc.), the image capturing module 3 (e.g., a web cam) and the main display screen (e.g., a computer monitor), while the online store server or service provider is in control of the marker database 11, the garment database 12, the image recognition module 13 and the image processing module 19. The marker database 11, the garment database 12, the image recognition module 13 and the image processing module 14 may be in the form of software programs installed in the server. The first preferred embodiment may also be used by an actual store (as opposed to an online store), where the store provides all of the handheld device 2, the image capturing module 3, the main display screen 4, the marker database 11, the garment database 12, the image recognition module 13 and the image processing module 14 for use by its customers. Any consumer (i.e., the user 9) who walks into the store can simply use the system 1 to virtually try on any piece of garment he/she desires.

In this embodiment, the marker database 11 and the image recognition module 13 may be implemented using ARToolKit, which is an open source library for building augmented reality applications. ARToolKit is capable of using computer graphics principles to determine a position of the physical maker 8 tagged on the user 9 relative to the image capturing module 3, and is also capable of fast and accurate tracking of the movement of the physical maker 8. Further, the image processing module 14 forms the first, second and third composite images 71, 72, 72', 73 with reference to the size and location of the physical marker 8 in the image of the user 9 as captured by the image capturing module 3. For instance, the image processing module 14 may be implemented using a three-dimensional (3D) graphics tool that conforms to the OpenGL specification. The image processing module 14 retrieves from the garment database 12 a corresponding bit-map image of the selected garment (i.e., one of the backside image, the front side image, the left side image and the right side image) corresponding to the try-on angle of the user 9 (i.e., one of the backside, the front side, the left side and the right side) chosen/determined with reference to the image of the user 9 as captured by the image capturing module 3, makes the background of the corresponding bitmap image transparent so as to leave only the body of the selected garment in the image, and then superimposes the resultant image onto the image of the user 9 as captured by the image capturing unit 3 for display on the screen 21 of the handheld device 2 and/or the main display screen 4.

With reference to FIG. 2, in this embodiment, the user 9 is tagged with two of the physical markers 8. The information in the garment database 12 and corresponding to each of said at least one garment includes the backside image of the garment in each of two different sizes. The image recognition module 13 determines from the image of the user 9 as captured by the image capturing module 3 whether each of the two physical markers 8 corresponds to the backside marker 8a with reference to the marker database 11. The image processing module 14 determines a distance between the two physical markers 8 with reference to the image of the user 9 so as to serve as a shoulder width of the user 9 when the image recognition module 13 determines that each of the two physical markers 8 corresponds to the backside marker 8a. The image processing module 14 retrieves from the garment database 12 the backside image with reference to the shoulder width, and the backside image thus retrieved is of the size that is the most closely related to the shoulder width.

It should be noted herein that one would readily appreciate that the patterns on the physical markers 8 are not limited to those illustrated herein, and can be any pattern that is recognizable by the image recognition module 13 or that can be used in augmented reality applications.

Similarly, with reference to FIG. 4, the information in the garment database 13 and corresponding to each of said at least one garment includes the front side image of the garment in each of two different sizes. The image recognition module 13 determines from the image of the user 9 as captured by the image capturing module 3 whether each of the two physical markers 8 corresponds to the front side marker 8c with reference to the marker database 11. The image processing module 14 determines a distance between the two physical markers 8 with reference to the image of the user 9 so as to serve as a shoulder width of the user 9 when the image recognition module 13 determines that each of the two physical markers B corresponds to the front side marker 8c. The image processing module 14 retrieves from the garment database 12 the front side image with reference to the shoulder width, and the front side image thus retrieved is of the size that is the most closely related to the shoulder width.

It should be further noted herein that although it is illustrated in this embodiment that there is only one type of backside marker 8a and one type of front side marker 8c, there may be multiple types of backside makers 8a (e.g., two types of backside markers to be tagged respectively on a left backside shoulder of the user 9 and a right backside shoulder of the user 9) and multiple types of front side markers 8c, such that when the user 9 is, for instance, tagged with two different types of backside markers 8a, marker recognition and shoulder width determination can still be performed smoothly and successfully.

With reference to FIGS. 1, 2, 6A and 6B, the first preferred embodiment of a machine-implemented method for use with a handheld device 2 to enable a user 9 to virtually try on a selected garment using augmented reality includes the following steps.

Figure 6A:
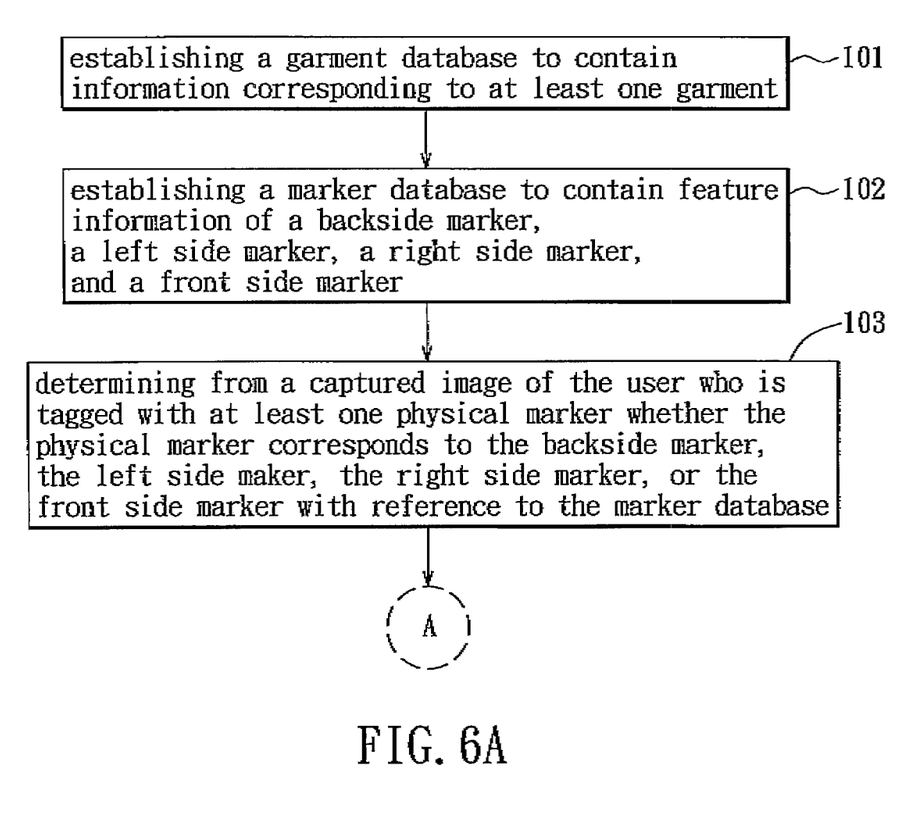
FIG. 6A and FIG. 6B cooperatively illustrate a flow chart, illustrating the first preferred embodiment of a machine-implemented method for enabling a user to virtually try on a selected garment using augmented reality according to the present invention.

In step 101, a garment database 12 is established to contain information corresponding to at least one garment. The information corresponding to each of said at least one garment includes a backside image, a left side image, a right side image and a front side image of the garment.

In step 102, a marker database 11 is established to contain feature information of a backside marker 8a, a left side marker 8b, a right side marker 8b', and a front side marker 8c.

In step 103, it is determined from a captured image of the user 9 who is tagged with at least one physical marker B whether the physical marker 8 corresponds to the backside marker 8a, the left side maker 8b, the right side marker 8b', or the front side marker 8c with reference to the marker database 11.

If the physical marker 8 corresponds to the backside marker 8a, the flow goes to step 104, where it is retrieved from the garment database 12 the backside image of a selected one of said at least one garment. Next, in step 105, the backside image retrieved in step 104 is superimposed onto the captured image of the user 9 to form a first composite image 71 for display on a screen 21 of the handheld device 2.

If the physical marker 8 corresponds to the left side marker 8b, the flow goes to step 106, where it is retrieved from the garment database 12 the left side image of the selected one of said at least one garment. Next, in step 107, the left side image retrieved in step 106 is superimposed onto the captured image of the user 9 to form a second composite image 72 for display on at least one of the screen 21 of the handheld device 2 and a main display screen 4.

Figure 6B:
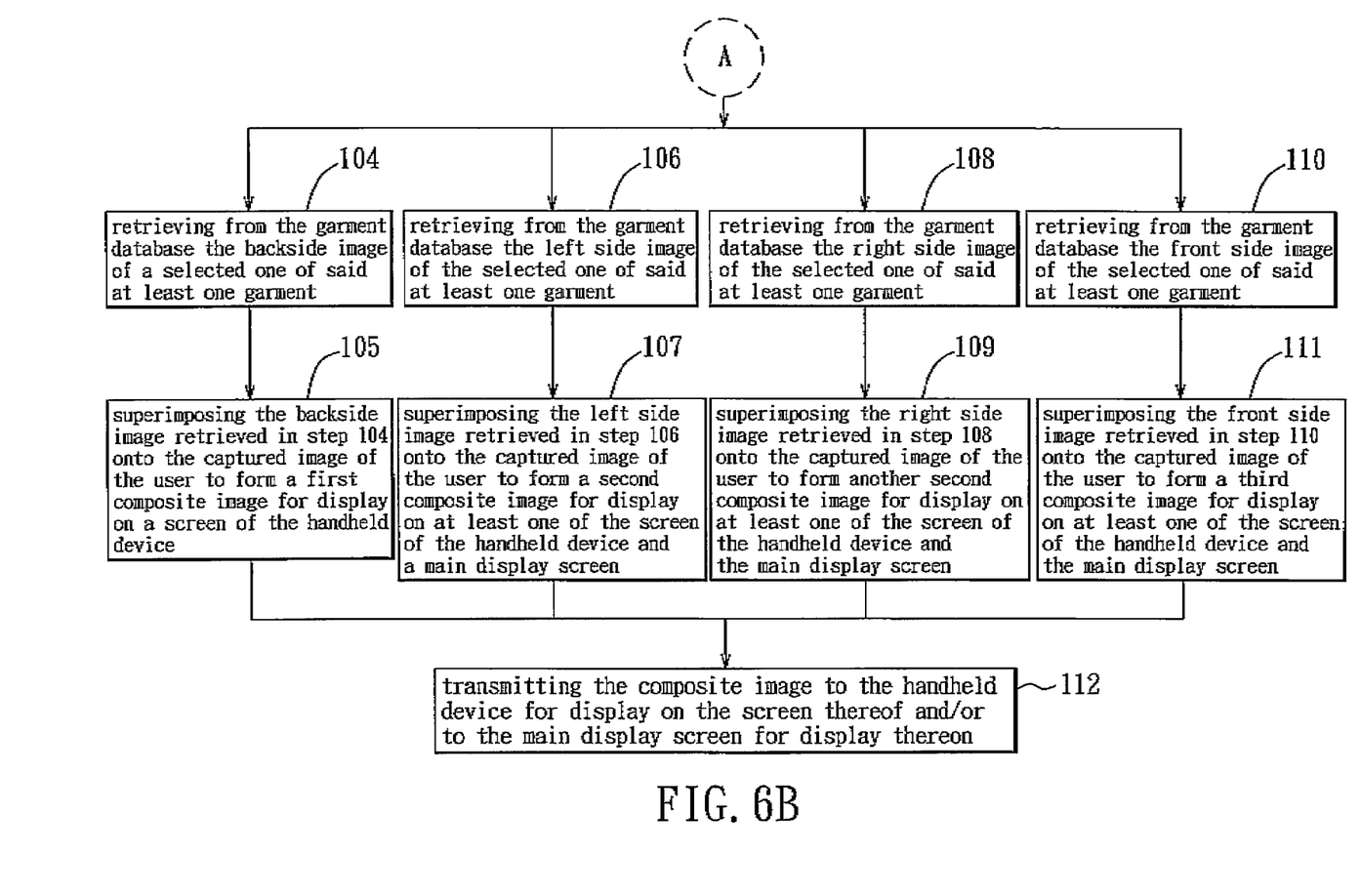

If the physical marker 8 corresponds to the right side marker 8b', the flow goes to step 108, where it is retrieved from the garment database 12 the right side image of the selected one of said at least one garment. Next, in step 109, the right side image retrieved in step 108 is superimposed onto the captured image of the user 9 to form another second composite image 72' for display on at least one of the screen 21 of the handheld device 2 and the main display screen 4.

If the physical marker 8 corresponds to the front side marker 8c, the flow goes to step 110, where it is retrieved from the garment database 12 the front side image of the selected one of said at least one garment. Next, in step 111, the front side image retrieved in step 110 is superimposed onto the captured image of the user 9 to form a third composite image 73 for display on at least one of the screen 21 of the handheld device 2 and the main display screen 4.

After completion of each of steps 105, 107, 109 and 111, the flow goes to step 112, where the composite image 71, 72, 72', 73 is transmitted to the handheld device 2 for display on the screen 21 thereof and/or to the main display screen 4 for display thereon.

Figure 7:
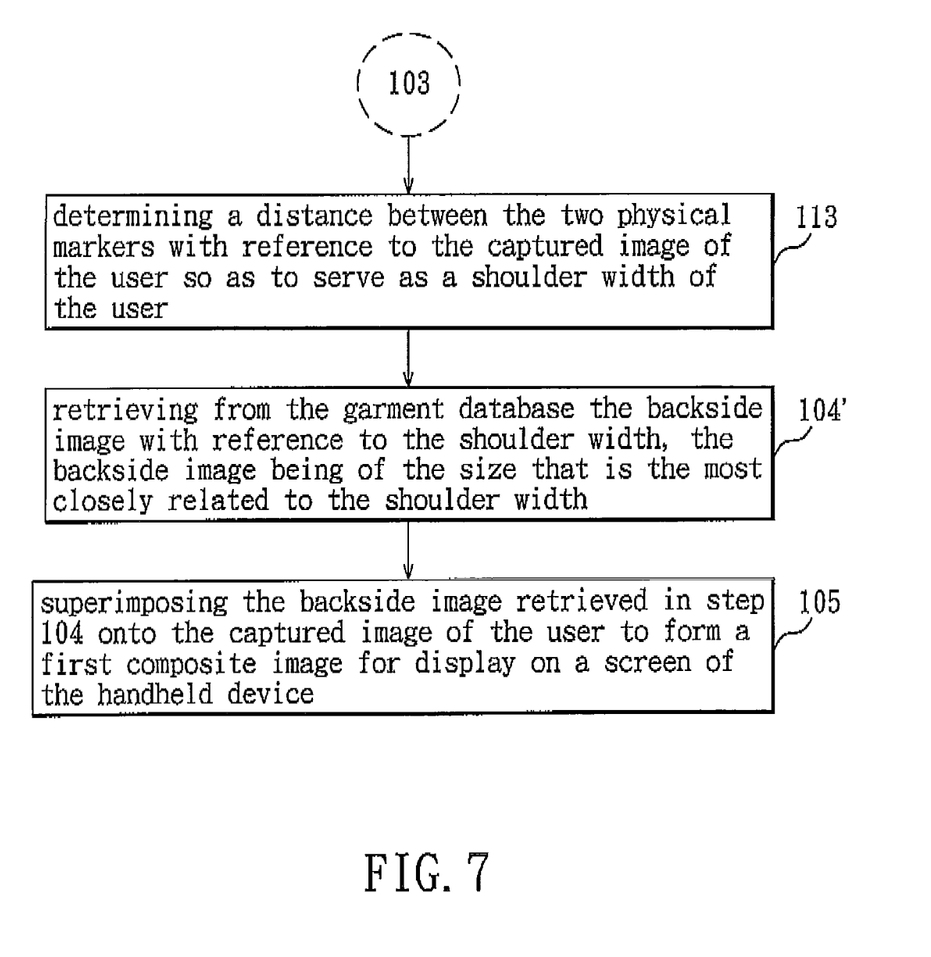
FIG. 7 is a flow chart, illustrating partial steps of another implementation of the first preferred embodiment where the user is tagged with two physical markers.
Figure 8:
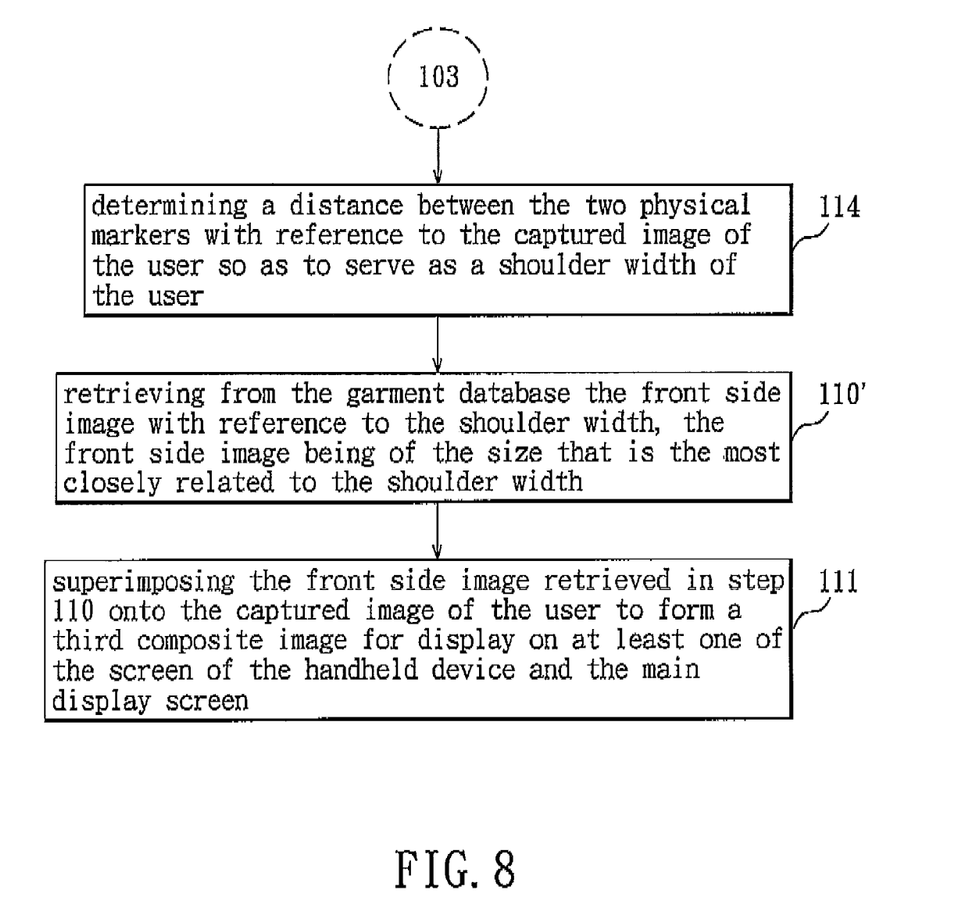
FIG. 8 is a flow chart, illustrating partial steps of said another implementation of the first preferred embodiment.

Alternatively, with reference to FIG. 2 and FIG. 7, in the garment database 12 established in step 101, the information corresponding to each of said at least one garment includes the backside image of the garment in each of two different sizes, and the front side image of the garment in each of two different sizes. If the user 9 is tagged with two physical markers 8, and from a single captured image of the user 9, if each of the two physical markers 8 is recognized by the image recognition module 13 to correspond to the backside marker 8a, the flow after Step 103 shown in FIG. 6A goes to step 113, where a distance between the two physical markers 8 is determined with reference to the captured image of the user 9 so as to serve as a shoulder width of the user 9. Subsequently, the flow goes to step 104', where the backside image is retrieved from the garment database 12 with reference to the shoulder width, and is of the size that is the most closely related to the shoulder width. The retrieved backside image is then superimposed onto the captured image of the user 9 to form the first composite image 71 for display on the screen 21 of the handheld device 2 in step 105. Similarly, with reference to FIG. 5 and FIG. 8, from a single captured image of the user 9, if each of the two physical markers 8 is recognized by the image recognition module 13 to correspond to the front side marker 8c, the flow after step 103 would go to step 119, where a distance between the two physical markers 8 is determined with reference to the captured image of the user 9 so as to serve as a shoulder width of the user 9. Subsequently, the flow goes to step 110', where the front side image is retrieved from the garment database 12 with reference to the shoulder width, and is of the size that is the most closely related to the shoulder width. The retrieved front side image is then superimposed onto the captured image of the user 9 to form the third composite image 73 for display on the screen 21 of the handheld device 2 in step 111.

It should be noted herein that there may be information in the garment database 12 that corresponds to more than two different sizes for the same garment.

Figure 9:
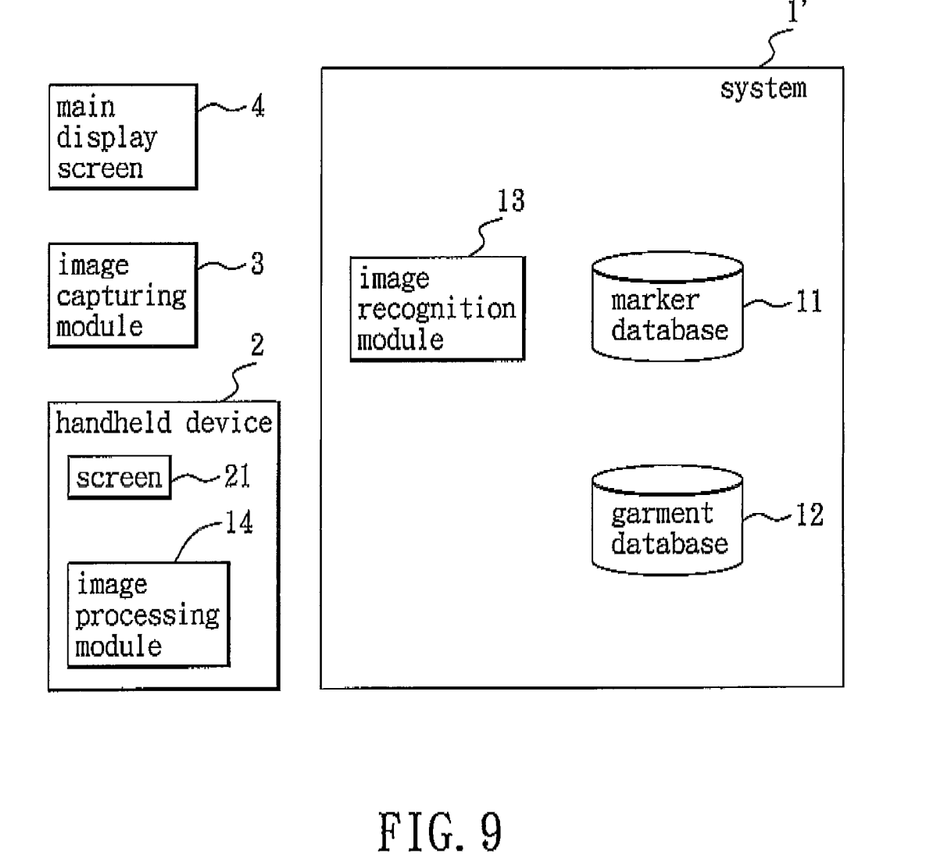
FIG. 9 is a block diagram, illustrating the second preferred embodiment of a system for enabling a user to virtually try on a selected garment using augmented reality according to the present invention.

With reference to FIG. 2 and FIG. 9, the second preferred embodiment of a system 1' for enabling a user 9 to virtually try on a selected garment using augmented reality differs from the first preferred embodiment in that the image processing module 14 is provided in the handheld device 2, and that the image recognition module 13 notifies the image processing module 14 of the result of its determination of whether, from the image of the user 9 as captured by the image capturing module 3, the physical marker 8 corresponds to the backside marker 8a, the left side marker 8b, the right side marker 8b' or the front side marker 8c. This embodiment may be implemented, for instance, by installing the image processing module 14 in the form of an application software on the handheld device 2, which is in the possession of the user 9 and is in communication with the system 1 wirelessly, over a wire, or over the Internet, etc.

Figure 10A:
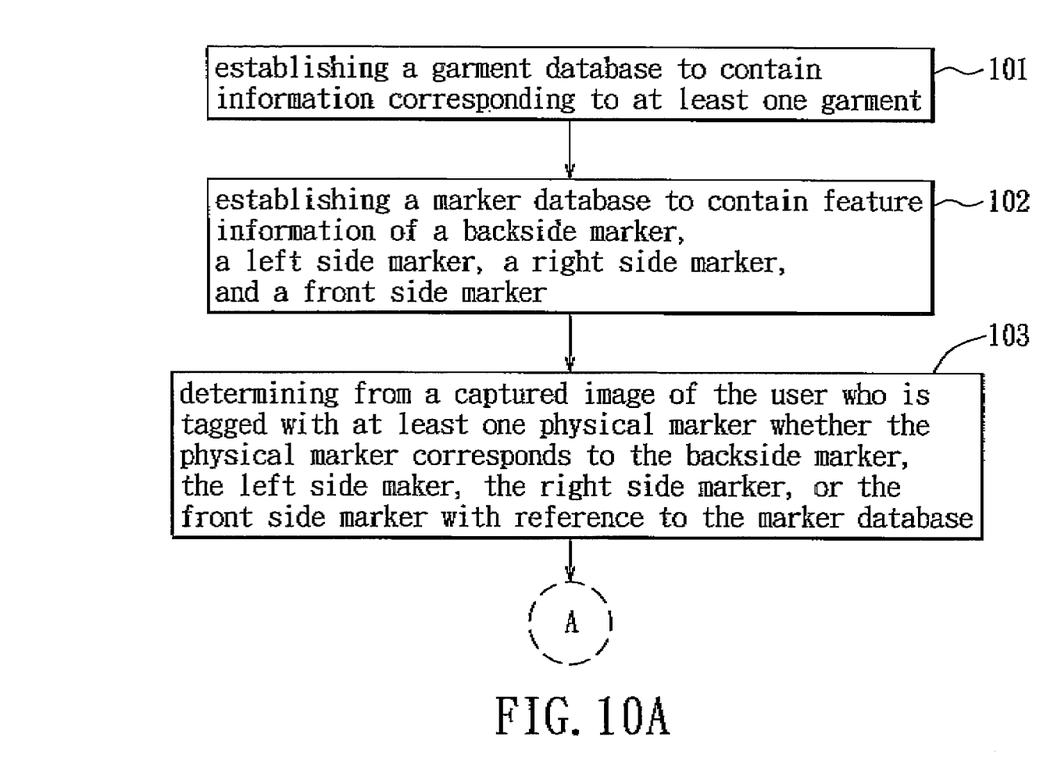
FIG. 10A and FIG. 10B cooperatively illustrate a flow chart, illustrating the second preferred embodiment of a machine-implemented method for enabling a user to virtually try on a selected garment.
Figure 10B:
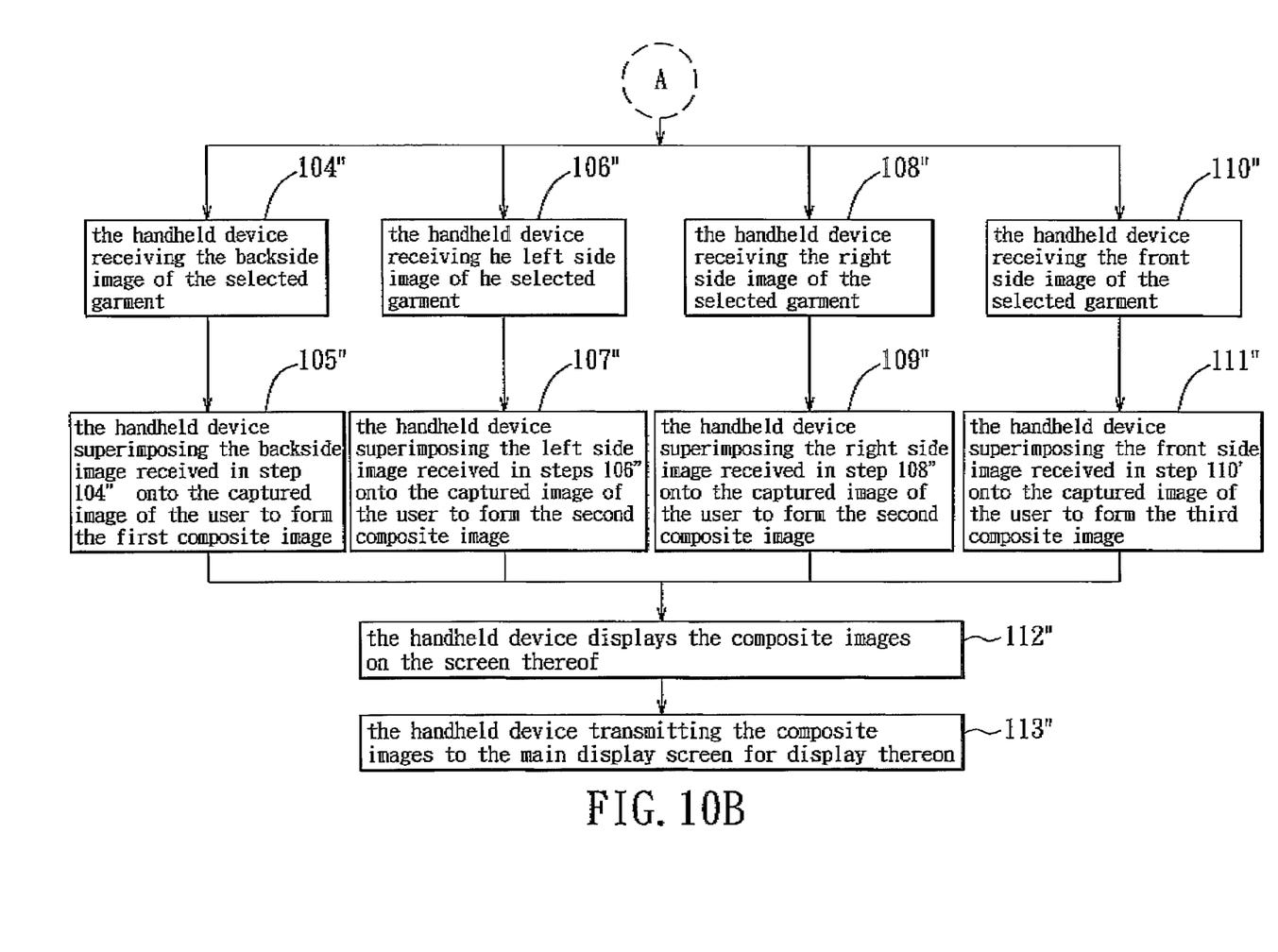

Accordingly, with further reference to FIGS. 10A and 10B, the second preferred embodiment of a machine-implemented method for enabling a user to virtually try on a selected garment using augmented reality differs from the first preferred embodiment in that, in step 104", the handheld device 2 receives the backside image of the selected garment, and step 105", the handheld device 2 superimposes the backside image received in step 104" onto the captured image of the user 9 to form the first composite image 71. Similarly, in steps 106", 108" and 110", the handheld device 2 receives the left side, right side and front side images of the selected garment, respectively, while in steps 107", 109" and 111", the handheld device 2 superimposes the left side, right side and front side images respectively received in steps 106", 108" and 110" onto the captured image of the user 9 to form the second and third composite images 72, 72', 73, respectively.

Subsequently, in step 112", the handheld device 2 displays the composite images 71, 72, 72', 73 on the screen 21 thereof. In addition, in step 113", the handheld device 2 transmits the composite images 71, 72, 72', 73 to the main display screen 4 for display thereon, and step 113" is an optional step.

Furthermore, the present invention also provides a computer program product, which comprises a computer readable storage medium that includes program instructions, which when executed by an electronic device, cause the electronic device to perform the machine-implemented method as disclosed hereinabove.

In summary, the present invention achieves the following advantages. First of all, the present invention is designed to be used with a handheld device 2 so as to enable the user 9 to see how the selected garment would fit on him/her from the back and side, and not just from the front. In addition, the present invention is capable of automatically selecting a size that would most appropriately fit the user 9 by the use of two physical markers 8 and the ability to determine a shoulder width.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A machine-implemented method for use with a handheld device to enable a user to virtually try on a selected garment using augmented reality, the machine-implemented method comprising the steps of:
   (A) establishing a garment database containing information corresponding to at least one garment, the information corresponding to each of said at least one garment including a backside image of the garment;
   (B) establishing a marker database containing feature information of a backside marker; and
   (C) upon determining from a captured image of the user who is tagged with at least one physical maker that the physical marker corresponds to the backside marker with reference to the marker database, performing the sub-steps of
      (C-1) retrieving from the garment database the backside image of a selected one of said at least one garment, and
      (C-2) superimposing the backside image retrieved in sub-step (C-1) onto the captured image of the user to form a composite image for display on a screen of the handheld device.

2. The machine-implemented method as claimed in claim 1, wherein step (C) further includes the sub-step of transmitting the composite image to the handheld device for display on the screen thereof.

3. The machine-implemented method as claimed in claim 1, wherein, in sub-step (C-1), the backside image of the selected one of said at least one garment is received by the handheld device, and in sub-step (C-2), superimposing of the backside image onto the captured image of the user to form the composite image is performed by the handheld device.

4. The machine-implemented method as claimed in claim 1, the user being tagged with two of the physical markers, wherein:
   in the garment database established in step (A), the information corresponding to each of said at least one garment includes the backside image of the garment in each of two different sizes; and
   upon determining in step (C) that each of the two physical markers corresponds to the backside marker with reference to the marker database, step (C) further includes the sub-step of determining a distance between the two physical markers with reference to the captured image of the user so as to serve as a shoulder width of the user, and in sub-step (C-1), the backside image is retrieved from the garment database with reference to the shoulder width, and is of the size that is the most closely related to the shoulder width.

5. The machine-implemented method as claimed in claim 1, wherein:
in the garment database established in step (A), the information corresponding to each of said at least one garment further includes a left/right side image of the garment;
the marker database established in step (B) further contains feature information of a left/right side marker; and
the machine-implemented method further comprises the step of
(D) upon determining from the captured image of the user that the physical marker corresponds to the left/right side marker with reference to the marker database, performing the sub-steps of
(D-1) retrieving from the garment database the left/right side image of the selected one of said at least one garment, and
(D-2) superimposing the left/right side image retrieved in sub-step (D-1) onto the captured image of the user to form another composite image for display on at least one of the screen of the handheld device and a main display screen.

6. The machine-implemented method as claimed in claim 5, wherein step (D) further includes the sub-step of transmitting said another composite image to at least one of the handheld device and the main display screen for display on said at least one of the screen of the handheld device and the main display screen.

7. The machine-implemented method as claimed in claim 1, wherein:
in the garment database established in step (A), the information corresponding to each of said at least one garment further includes a front side image of the garment;
the marker database established in step (B) further contains feature information of a front side marker; and
the machine-implemented method further comprises the step of
(E) upon determining from the captured image of the user that the physical marker corresponds to the front side marker with reference to the marker database, performing the sub-steps of
(E-1) retrieving from the garment database the front side image of the selected one of said at least one garment, and
(E-2) superimposing the front side image retrieved in sub-step (E-1) onto the captured image of the user to form another composite image for display on at least one of the screen of the handheld device and a main display screen.

8. The machine-implemented method as claimed in claim 7, wherein step (E) further includes the sub-step of transmitting said another composite image to at least one of the handheld device and the main display screen for display on said at least one of the screen of the handheld device and the main display screen.

9. The machine implemented method as claimed in claim 7, the user being tagged with two of the physical markers, wherein:
in the garment database established in step (A), the information corresponding to each of said at least one garment includes the front side image of the garment in each of two different sizes; and
upon determining in step (E) that each of the two physical markers corresponds to the front side marker with reference to the marker database, step (E) further includes the sub-step of determining a distance between the two physical markers with reference to the captured image of the user so as to serve as a shoulder width of the user, and in sub-step (E-1), the front side image is retrieved from the garment database with reference to the shoulder width, and is of the size that is the most closely related to the shoulder width.

10. A computer program product, comprising a non-transitory computer readable storage medium that includes program instructions, which when executed by an electronic device, cause the electronic device to perform the method according to claim 1.

11. A system to be used with a handheld device that includes a screen and an image capturing module that captures an image of a user for enabling the user to virtually try on a selected garment using augmented reality, the user being tagged with at least one physical marker, said system comprising:
a processor that executes:
a marker database containing feature information of a backside marker;
a garment database containing information corresponding to at least one garment, the information corresponding to each of said at least one garment including a backside image of the garment;
an image recognition module capable of accessing the marker database, and determining from the image of the user as captured by the image capturing module whether the physical marker corresponds to the backside marker with reference to said marker database; and
an image processing module in communication with said image recognition module, and capable of accessing said garment database, said image processing module retrieving from said garment database the backside image of a selected one of said at least one garment, and superimposing the backside image thus retrieved onto the image of the user as captured by the image capturing module to form a composite image for display on the screen of the handheld device when said image recognition module determines that the physical marker corresponds to the backside marker.

12. The system as claimed in claim 11, wherein said image processing module transmits the composite image to the handheld device for display on the screen of the handheld device.

13. The system as claimed in claim 11, wherein said image processing module is provided in the handheld device, and said image recognition module notifies said image processing module of the result of the determination.

14. The system as claimed in claim 11, the user being tagged with two of the physical markers, wherein:
the information in said garment database and corresponding to each of said at least one garment includes the backside image of the garment in each of two different sizes;
said image recognition module determines from the image of the user as captured by the image capturing module whether each of the two physical markers corresponds to the backside marker with reference to said marker database;

said image processing module determines a distance between the two physical markers with reference to the image of the user so as to serve as a shoulder width of the user when said image recognition module determines that each of the two physical markers corresponds to the backside marker; and said image processing module retrieves from said garment database the backside image with reference to the shoulder width, the backside image thus retrieved being of the size that is the most closely related to the shoulder width.

15. The system as claimed in claim 11, which is for use with a main display screen, wherein:
the information in said garment database and corresponding to each of said at least one garment further includes a left/right side image of the garment;
said marker database further contains feature information of a left/right side marker;
said image recognition module further determines from the image of the user as captured by the image capturing module whether the physical marker corresponds to the left/right side marker with reference to said marker database; and
said image processing module retrieves from said garment database the left/right side image of the selected one of said at least one garment, and superimposes the left/right side image thus retrieved onto the image of the user as captured by the image capturing module to form another composite image for display on at least one of the screen of the handheld device and the main display screen when said image recognition module determines that the physical marker corresponds to the left/right side marker.

16. The system as claimed in claim 11, which is for use with a main display screen, wherein:
the information in said garment database and corresponding to each of said at least one garment further includes a front side image of the garment;
said marker database further contains feature information of a front side marker;
said image recognition module further determines from the image of the user as captured by the image capturing module whether the physical marker corresponds to the front side marker with reference to said marker database; and
said image processing module retrieves from said garment database the front side image of the selected one of said at least one garment, and superimposes the front side image thus retrieved onto the image of the user to form another composite image for display on at least one of the screen of the handheld device and the main display screen when said image recognition module determines that the physical marker corresponds to the front side marker.

17. The system as claimed in claim 16, the user being tagged with two of the physical markers, wherein:
the information in said garment database and corresponding to each of said at least one garment includes the front side image of the garment in each of two different sizes;
said image recognition module determines from the image of the user as captured by the image capturing module whether each of the two physical markers corresponds to the front side marker with reference to said marker database;
said image processing module determines a distance between the two physical markers with reference to the image of the user so as to serve as a shoulder width of the user when said image recognition module determines that each of the two physical markers corresponds to the front side marker; and
said image processing module retrieves from said garment database the front side image with reference to the shoulder width, the front side image thus retrieved being of the size that is the most closely related to the shoulder width.

* * * * *